(12) United States Patent
Staats et al.

(10) Patent No.: US 8,749,963 B2
(45) Date of Patent: Jun. 10, 2014

(54) HOUSING FOR SLATE TABLET COMPUTER

(75) Inventors: Kai Staats, Loveland, CO (US);
Leonard Roach, Morrisville, PA (US);
Christopher Miller, Draper City, UT (US)

(73) Assignee: Over the Sun, LLC, Loveland, CO (US)

(*) Notice: Subject to any disclaimer, the term of this patent is extended or adjusted under 35 U.S.C. 154(b) by 339 days.

(21) Appl. No.: 13/048,653

(22) Filed: Mar. 15, 2011

(65) Prior Publication Data

US 2011/0222238 A1 Sep. 15, 2011

Related U.S. Application Data

(60) Provisional application No. 61/340,351, filed on Mar. 15, 2010.

(51) Int. Cl.
*H05K 5/00* (2006.01)

(52) U.S. Cl.
USPC ............ 361/679.26; 361/679.09; 361/679.27; 361/679.29; 361/726; 248/121; 248/346.03

(58) Field of Classification Search
USPC ............ 361/679.02, 679.09, 679.21, 679.26, 361/679.29, 679.55–679.58, 725–727
See application file for complete search history.

(56) References Cited

U.S. PATENT DOCUMENTS

| | | |
|---|---|---|
| 5,871,094 A * | 2/1999 | Leibowitz .................... 206/320 |
| 6,944,012 B2 | 9/2005 | Doczy et al. |
| 6,952,343 B2 | 10/2005 | Sato |
| 6,980,420 B2 | 12/2005 | Maskatia et al. |
| 7,002,794 B2 | 2/2006 | Wang et al. |
| 7,042,712 B2 * | 5/2006 | Ghosh et al. ............ 361/679.03 |
| 7,052,296 B2 | 5/2006 | Yang et al. |
| 7,068,496 B2 | 6/2006 | Wong et al. |
| D524,312 S | 7/2006 | Young |
| 7,088,340 B2 | 8/2006 | Kato |
| 7,197,332 B2 | 3/2007 | Andersson et al. |
| 7,206,196 B2 * | 4/2007 | Ghosh et al. ............ 361/679.09 |
| 7,236,354 B2 | 6/2007 | Hsu et al. |
| 7,251,127 B2 | 7/2007 | Ghosh et al. |
| 7,336,480 B2 | 2/2008 | Kwon |
| 7,353,052 B2 | 4/2008 | Yamasaki |
| 7,414,834 B2 | 8/2008 | Ukonaho et al. |
| 7,426,406 B2 | 9/2008 | Maatta et al. |
| 7,472,267 B2 | 12/2008 | Park et al. |

(Continued)

OTHER PUBLICATIONS

Blickenstorfer, Conrad H., "Tablet PCs: HP Compaq Tablet PC TC1000" Pen Computing Magazine, Dec. 2002, http://www.pencomputing.com/frames/tpc_compaq.html, 3 pages.

(Continued)

*Primary Examiner* — Courtney Smith
(74) *Attorney, Agent, or Firm* — HolzerIPLaw, PC

(57) ABSTRACT

A housing for a slate tablet computer is composed of a frame component and an input component. The frame component is removably attached to the input component. A support mechanism attached to the input component, wherein the support mechanism extends from the input component to oppose inadvertent rotating of the slate tablet computer housing around a hinge connecting the frame component and the input component. In an alternate implementation, a support mechanism attached to the frame component is used to prevent the inadvertent rotating of the slate tablet computer housing around a hinge connecting the frame component and the input component.

19 Claims, 12 Drawing Sheets

(56) References Cited

U.S. PATENT DOCUMENTS

| | | | | |
|---|---|---|---|---|
| 7,948,744 | B2* | 5/2011 | Bishop et al. | 361/679.27 |
| 2004/0007649 | A1* | 1/2004 | Vettraino | 248/127 |
| 2005/0057894 | A1* | 3/2005 | Kim et al. | 361/683 |
| 2005/0111182 | A1* | 5/2005 | Lin et al. | 361/686 |
| 2005/0128695 | A1* | 6/2005 | Han | 361/683 |
| 2005/0168925 | A1* | 8/2005 | Fang et al. | 361/683 |
| 2006/0034045 | A1* | 2/2006 | Wang | 361/683 |
| 2006/0104020 | A1* | 5/2006 | Fan et al. | 361/683 |
| 2009/0244009 | A1* | 10/2009 | Staats et al. | 345/168 |

OTHER PUBLICATIONS

Rubin, Ross "Switched On; Connecting Mobile, Mantle and Metal Objects (Part 1)" http://www.engadget.com/2009/03/05/switched-on-connecting-mobile-mantle-and-metal-objects-part-1I; Mar. 5, 2009, 3 pages.

Baran, Daya, "Lenovo Ideapad Will Win Where Microsoft Failed," Jan. 11, 2010, http://www.webguild.org/20100111/lenovo-ideapad-will-win-where-microsoft-failed, 5 pages.

Always Innovating: Introducing the Touch Book, http://www.alwaysinnovating.com/touchbook/; downloaded Mar. 31, 2010, 2 pages.

Miller, Paul, "Touch Book from Always Innovating Harbors Removable Tablet, Netbook Pricepoint," posted Mar. 2, 2009, http://www.engadget.com/2009/03/02/touch-book-from-always-innovating-harbors-removable-tablet-netb/, 7 pages.

* cited by examiner

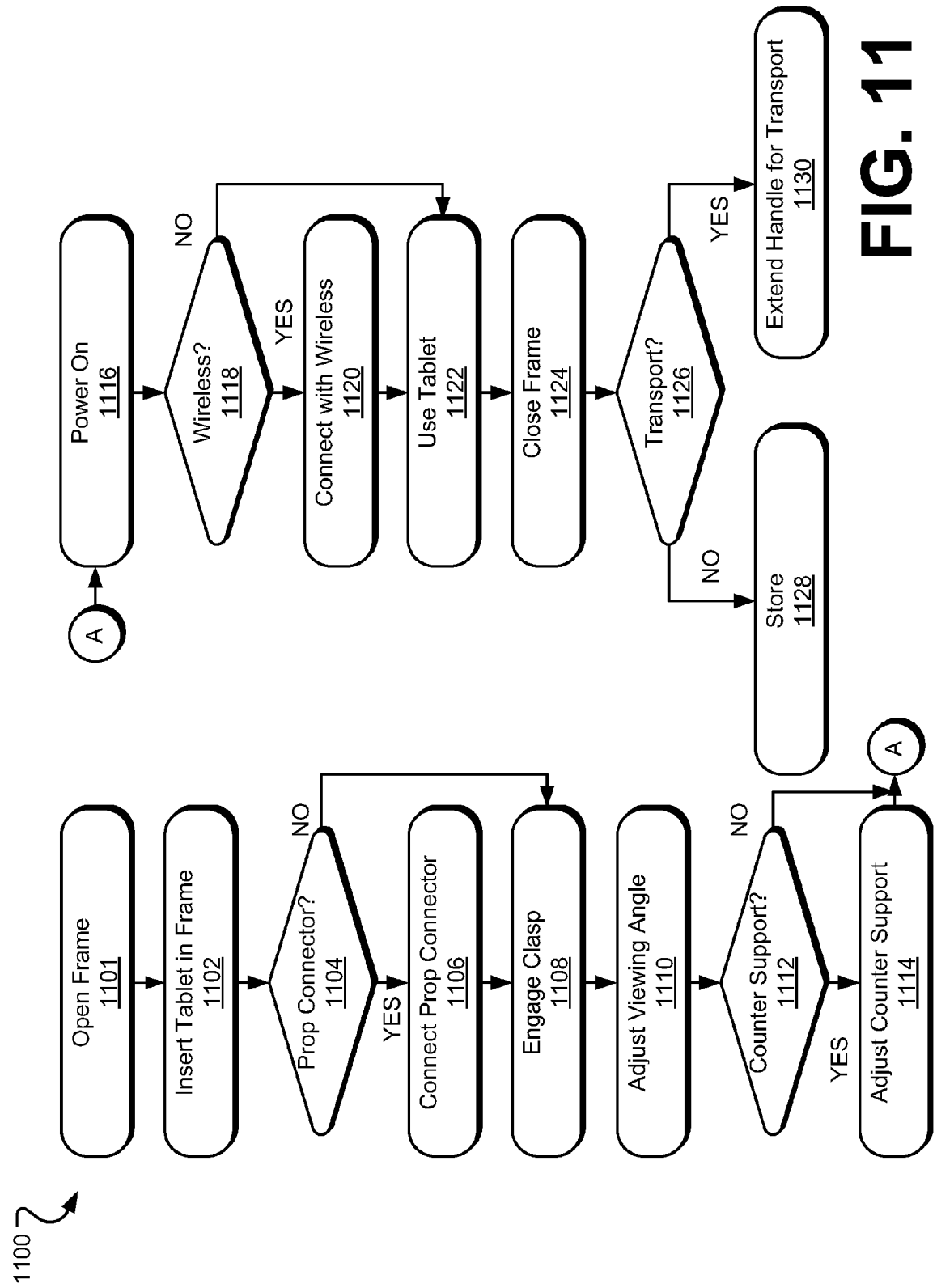

HOUSING FOR SLATE TABLET COMPUTER

CROSS-REFERENCE TO RELATED APPLICATIONS

This application claims priority of U.S. Provisional Application No. 61/340,351, entitled "Housing for Slate Tablet Computer" and filed Mar. 15, 2010, which is incorporated hereby into this application by reference in its entirety.

BACKGROUND

Tablet computers have many advantages not found in standard desktop or notebook computers. Chief among these advantages is usually the ability to interface with the tablet computer by writing on or tapping a touch screen display using a stylus or other implement. Input to the computer may thus be entered in a manner similar to writing on paper rather than using a keyboard. This model provides great efficiency in note-taking environments, or when used in a highly mobile environment where it is difficult to set up or use a keyboard and mouse to input data into the computer.

Laptop or notebook computers that emulate the function of a tablet computer are commonly referred to as "convertible" tablet computers. These notebook computers are equipped with a touch screen liquid crystal display (LCD) that opens, rotates, and closes again on top of the keyboard with the touch screen LCD facing outward for use as a tablet. In these notebook configurations, the substantial hardware of the computer including the processor, memory, and battery is housed in the keyboard portion of the notebook computer. While the touch screen LCD is hinged and rotatably attached to the keyboard section, it remains permanently affixed to the keyboard section, and therefore the touch screen LCD cannot be used independent of the keyboard portion as a stand-alone tablet computer.

A "tablet" mode allows the user to write or tap on the touch screen LCD without requiring access to a keyboard or mouse to input data into the computer. When used in the traditional notebook computer configuration, convertible tablets provide for enhanced input via the touch screen LCD. Convertible tablet computers, however, offer few advantages in terms of portability over traditional notebook computers.

Tablet computers commonly referred to as "slate" tablets offer a touch screen LCD interface, but lack a physical keyboard. This presents advantages for the slate tablet computer in terms of size, weight, portability, and ease of use as a writing surface. Unfortunately, the lack of a physical keyboard is also a great disadvantage. While many users may appreciate the flexibility of input through writing, writing is not necessarily an efficient means of input. For some applications, such as data entry or when writing a lengthy document such as this provisional patent application, a need for a physical keyboard exists.

In addition, a slate tablet computer can be awkward and/or uncomfortable to use for an extended period of time. For example, balancing a slate tablet computer on a user's lap while writing is uncomfortable. Thus, an external stand may be required to make use of the slate tablet computer more ergonomic and comfortable.

For these and other reasons, adoption of slate tablet computers was limited until recently, and use of these devices has primarily been in specialized industries with highly mobile users. Package delivery services, for example, have adopted tablet computing devices for field use. Slate tablet computers, however, are gaining in popularity.

In February 2010, Apple™ Computer announced a new slate tablet computer called the iPad™. Similarly, HewlettPackard™ has announced a slate tablet computer called the Slate™, and Microsoft™ has announced a slate-type computer called the Courier™. The iPad, for example, includes an ultra high resolution touch screen interface, light weight body, and long battery life. However, the iPad (and other slate tablet computers) lacks a physical keyboard and/or a physical pointing device such as a trackpad. Thus, slate tablet computers such as the iPad, Slate, and Courier may not be suitable for extended use in applications such as data entry, word processing, and the like.

The information included in this Background section of the Specification, including any references cited herein and any description or discussion thereof, is included for technical reference purposes only and is not to be regarded subject matter by which the scope of the invention is to be bound.

SUMMARY

The presently disclosed technology provides a slate tablet computer housing that converts an existing slate tablet computer to a traditional clamshell style notebook computer. One implementation of a housing thr a slate tablet computer is composed of a frame component configured to receive a slate tablet and an input component that includes at least one of a keyboard and a physical pointing device. In one implementation, the frame component is removably attached to the input component. The frame component includes a docking port that enables the slate tablet computer to communicatively connect to the input component, providing the functionality of a physical keyboard and/or physical pointing device to the slate tablet computer. In one implementation, the input component is a peripheral device that offers no computing functionality unless connected with the slate tablet computer housed within the frame component. However, in alternate implementation, the input component may provide one or more computing or storage functionality. In one implementation, the frame component houses a slate tablet computer which, when coupled with the functionality of the input component, provides the functional equivalence of a traditional laptop computer.

The input component is further configured with a support mechanism, such as a counterbalance armature, to oppose any rotating, or tilting over of the slate tablet computer housing due to the changing center of mass of the frame component when housing the slate tablet computer as the frame component is moved from a closed position to an open position. This prevents the total housing assembly from falling over when the bottom of the input component is resting on a flat surface or on the lap of the user. In one implementation, the counterbalance armature may function as a handle for carrying the housing when the counterbalance armature is in an extended position. In another implementation, the counterbalance armature may be retractable from the input component and partially housed within the input component when in a retracted position. In a further implementation, the counterbalance armature may interface with a tension hinge on the input component to prevent a user from rotating the frame component to an open position unless the counterbalance armature is extended.

In an alternate implementation, the input component comprises one or more fixed tension hinges, and a rotating tension hinge rotationally engaged with the one or more fixed tension hinges. The rotating tension hinge may further comprise an interface tab and the frame component further comprises a tab slot configured to releasably engage the interface tab. In yet alternate implementation, the interface tab further comprises one or more connection traces and the tab slot in the frame component further comprises one or more receptacles configured to communicatively engage the connection traces. In an alternate implementation, the rotating tension hinge further comprises a first engagement surface, the counterbalance armature is retractable with respect to the input component and defines a second engagement surface, and when the counterbalance armature is at least partially housed within the input component, the first engagement surface interfaces with the second engagement surface and prevents the frame component from being manipulated from a closed position to the open position.

In one implementation of the slate tablet computer housing disclosed herein, the counterbalance armature is forced to automatically extend from the input component as the frame component moves into an open position with respect to the input component. In an alternate implementation, the frame component further comprises a proprietary connector that is adapted to communicatively connect to the slate tablet computer. In an alternate implementation, the slate tablet computer housing comprises a frame component configured to attach to a slate tablet computer, an input component connected with the frame component, and a support mechanism attached to the frame component, wherein one end of the support mechanism is attached to a back surface of the frame component and a second end of the support mechanism is adapted to swing away from the frame component. The support mechanism is adapted to function as a carrying handle for the slate tablet computer housing.

Yet alternate implementation of the technology disclosed herein provides a method of using a slate tablet computer, the method comprising inserting the slate tablet computer into a frame component of a slate tablet computer housing, attaching the frame component to an input component, opening the frame component around a hinge mechanism connected to the input component, and retracting a support mechanism away from the input component. Retracting the support mechanism away from the input component may further comprise automatically retracting the support mechanism as the frame component is opened.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

BRIEF DESCRIPTIONS OF THE DRAWINGS

FIG. 11 illustrates a flowchart of using the slate tablet with the frame component of a housing illustrated herein.

DETAILED DESCRIPTIONS

Figure 1:
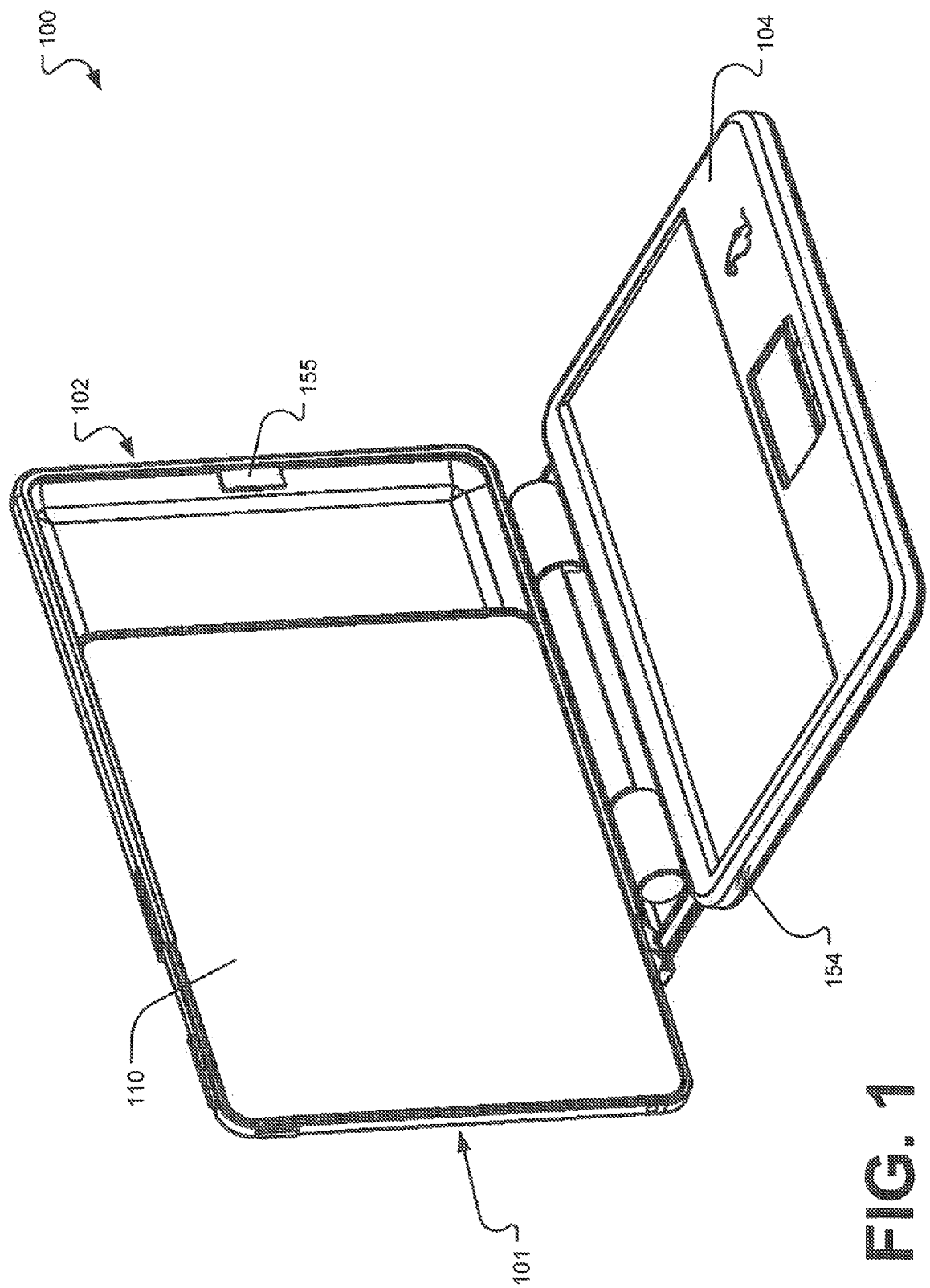
FIG. 1 illustrates a slate tablet computer partially inserted into a frame component of a housing for converting a slate tablet computer to a clamshell computer while the housing is in an open position.

The figures depict a new implementation of a laptop or notebook computer that utilizes an existing slate tablet computer. More specifically, FIG. 1 illustrates a slate tablet computer partially inserted into the frame component of a housing 100 for converting a slate tablet computer to a notebook/clamshell computer while the housing is in an open position. When fully inserted into the frame component 102, the slate tablet computer 101 engages a proprietary connector 155 that connects the slate tablet computer 101 with peripheral devices, such as a keyboard and physical pointing device of the input component 104 of the housing 100.

As shown in FIG. 1, in one implementation the slate tablet computer housing 100 is composed of two components, a frame component 102 and an input component 104. In contrast to known notebook or laptop computers, the hardware components providing the computing functionality to the slate tablet computer housing 100 are packaged within the slate tablet computer 101 while input component 104 functions merely as a peripheral device. This means that the slate tablet computer 101 houses the microprocessor, memory, power supply, graphics card, network card, wireless card, battery, DC transformer, serial bus, touch screen liquid crystal display (LCD), and/or other standard hardware components that, with the exception of an LCD screen, are packaged under the keyboard in a traditional notebook or laptop computer. In one implementation, the memory may be in the form of a high-capacity flash drive, thus creating an entirely solid state notebook computer with no moving parts.

In an alternate implementation, additional components may be provided with the input component 104. For example, in one implementation, the input component 104 includes a Bluetooth transceiver to transmit and receive information from the slate tablet computer 101. In an alternate implementation, a one or more adapters, such as a universal serial bus (USB) adapter, etc., can also be provided on the input component 104.

In one implementation, an upper portion of the frame component 102 is designed to receive a tablet and the upper portion shares a hinge with a lower portion of the frame component 102. In one implementation, the upper portion and the lower portion are parallel to each other. In one implementation, the hinge itself provides a spring-loaded mechanism that keeps the upper portion of the frame component 102 secure against the lower portion of the frame component 102, requiring minimal effort on behalf of the user to separate the two when opening the unit prior to use. In an alternate implementation, friction or magnetic clasp is used to engage the upper portion of the frame component 102 to the lower portion of the frame component 102.

In one implementation, the tablet computer 101 communicates with the input component 104 via a data link. Such a data link can be provided using a physical connector, such as the proprietary connector 155. In such an implementation, the input component 104 is connected via the physical data link to the proprietary connector 155 and the tablet is also connected to the proprietary connector 155. Such physical connectivity provides a fast and reliable method of communication between the tablet 101 and the input component 104.

In one implementation of the slate tablet computer housing 100, the input component 104 is adapted to communicate with the slate tablet computer 101 wirelessly. Thus, for example, the input component 104 may communicate with the slate tablet computer 101 using the Bluetooth communication protocol. In an alternate implementation, other wireless communication protocols are used.

Figure 2:
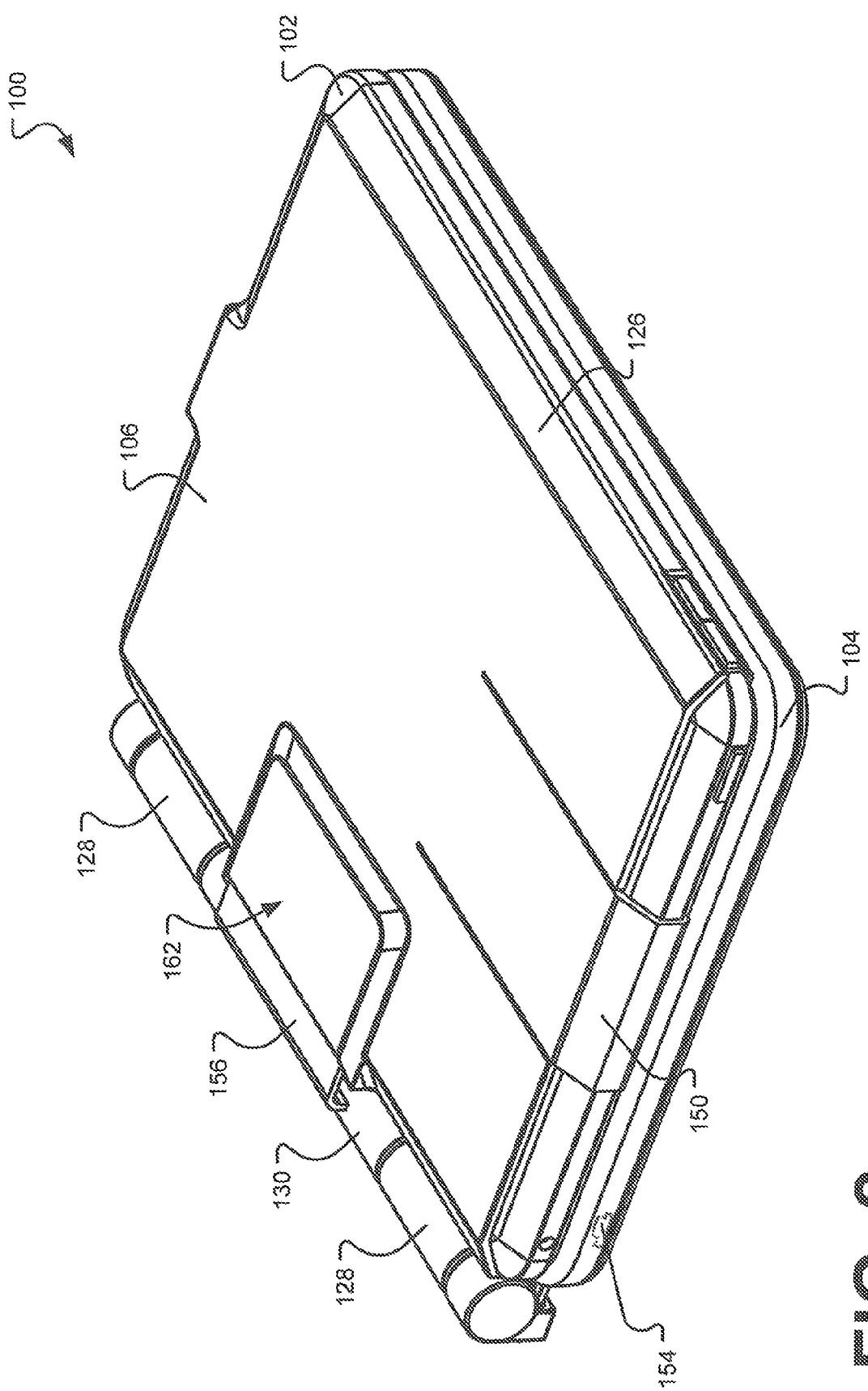
FIG. 2 is a top, orthogonal view of the retracted counter-balance mechanism with the housing of FIG. 1 in a closed position.

FIG. 2 depicts the slate tablet computer housing 100 in a closed position with the frame component 102 closed against the input component 104. In the configuration of FIG. 2, the back 106 of the frame component 102 is exposed. In one implementation, the back of the frame component is a solid plastic or metal material. However, it should be understood that other materials may be used to construct the housing.

As shown in FIG. 1, the slate tablet computer housing 100 may provide a number of network or peripheral interface ports, for example, a universal serial bus (USB) port 154. In addition, the slate tablet computer housing 100 may provide a receptacle for connecting to an external power source, thus powering or charging the slate tablet computer 101 when the slate tablet computer 101 is engaged with the proprietary connector 155. The receptacle may be configured to receive pins from a power supply cable or may provide a magnetic connection for quick release power supply cables. The slate tablet computer housing 100 may also define a compartment or slot for storage of a stylus for use in interfacing with the touch screen LCD 110. A power switch (not shown) may be provided on input component 104. In addition the slate tablet computer housing may further include one or more speakers.

Further, as illustrated in FIG. 1, the frame component 102 houses the proprietary connector 155 which matches and connects to the slate tablet computer 101 when inserted into the frame component 102 for the purpose of providing a unidirectional or bidirectional communication connection between the slate tablet computer 101 and the frame component 102. It should be understood that both the type of the proprietary connector 155 and the location of the proprietary connector 155 on the slate tablet computer and within the housing may vary. Internal to the frame component 102 are the cables (not shown) required to provide communication between the proprietary connection for the slate tablet computer 101 and the input component 104.

The assembly of the slate tablet computer 101 housed in the frame component 102, proprietary connector 155 to receive the slate tablet computer's digital interface, internal cables (not shown) which provide communication between the slate tablet computer 101 and the input component 104 provides for the full functionality of a traditional laptop computer. Further, in one implementation, the slate tablet computer housing may provide for expansion input and/or output ports, such as DVI in/out, VGA in/out, or other audio, video, or data communication ports.

An open side of the frame component 102 which receives the slate tablet computer 101 may include a clasp 150 which restricts the further movement or accidental release of the slate tablet computer 101 from the frame component 102. The clasp may be formed using, for example, a hinge such as a living plastic hinge or a mechanical hinge. The clasp mechanism 150 helps to prevent the slate tablet computer 101 from accidentally falling or releasing from the frame component 102 when the slate tablet computer 101 is inserted in the frame component 102 of the housing 100.

Figure 4:
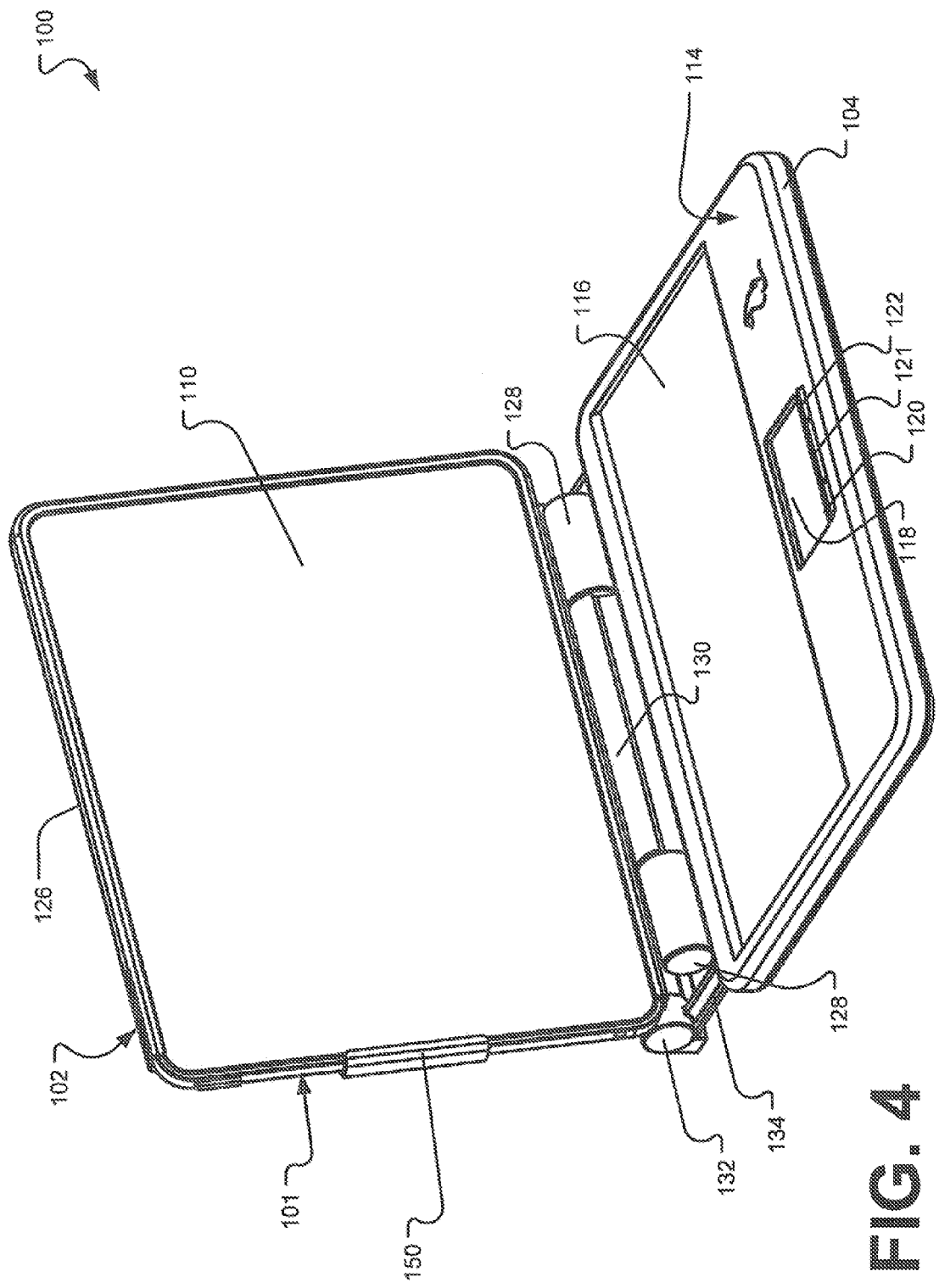
FIG. 4 is an isometric view of the slate tablet computer housing of FIG. 1 in an open position with the frame component connected to the keyboard component.

When the slate tablet computer housing 100 is in an open configuration as shown is FIG. 4, the top surface 114 of the input component 104 is exposed. The top surface 114 of the input component 104 may include a keyboard 116 and a touchpad/track pad 118 (or any other physical pointing device) for manipulation of a cursor or other onscreen elements on the touch screen LCD 110 of a slate tablet computer. The keyboard 116 may be configured as a standard button keyboard or as a flat membrane keypad to reduce the profile of the input component 104 and provide a higher level of environmental resistance when used in harsh operating environments. The touchpad 118 may additionally include a left-click button 120 and a right-click button 122 as with standard mouse controls for selection of objects and features within user interface. The touch pad may further include a center-click button 121 for additional functionality. In one implementation, a battery power system may be housed beneath the keyboard which, when coupled with the slate tablet computer via the power connector, may provided extended runtime for the slate tablet computer.

Figure 3:
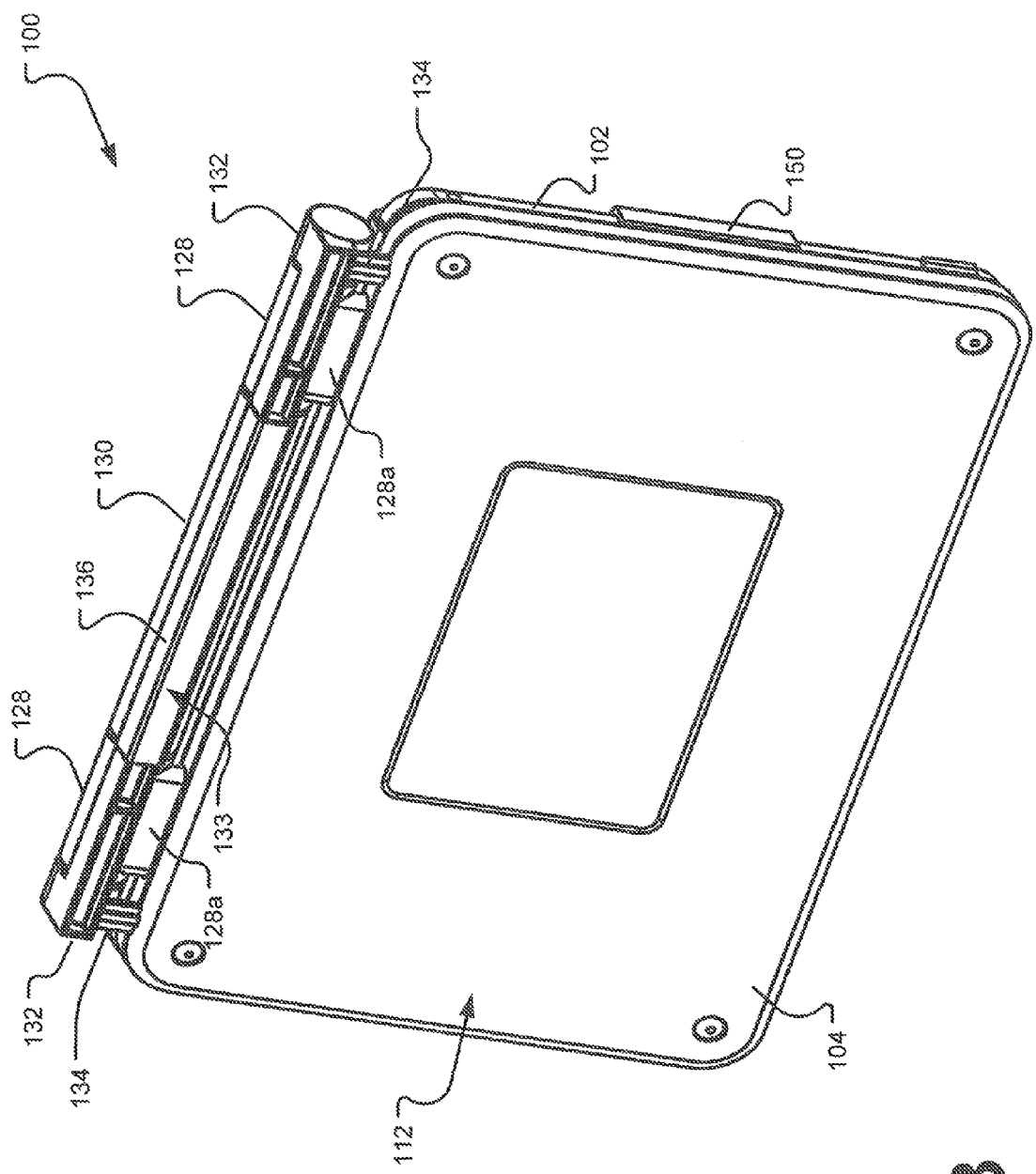
FIG. 3 is an isometric view of the bottom of the slate tablet computer housing of FIG. 1 particularly showing a bottom of the input component.

FIG. 3 is an isometric view of the bottom of the slate tablet computer housing 100 of FIG. 1 particularly showing a bottom of the input component 104. As shown in FIG. 3, when the slate tablet computer housing 100 is in a closed form, the frame component 102 is held together with the input component 104 via a clasp 150.

As shown in FIGS. 1-5, the frame component 102 of the slate tablet computer housing 100 may be mounted to the input component 104 in a hinged configuration. In one exemplary implementation as shown in the figures, two stationary tension hinges 128 may be fixed to the input component 104 via mounting members. A rotating tension hinge 130 is mounted in between the stationary tension hinges 128. The frame component 102 is removably mounted to the rotating tension hinge 130 in a manner further described below.

When the slate tablet computer housing 100 is in an open configuration and the frame component 102 is connected with the input component 104 as shown in FIG. 4, it may be appreciated that the slate tablet computer housing 100 is comparable to a normal laptop computer when a slate tablet computer is inserted in the frame component 102. However, the slate tablet computer housing 100 becomes relatively top-heavy when a slate tablet computer is inserted in the frame component because all of the hardware components are packaged within the slate tablet computer inserted in frame component 102. Thus, as the frame component 102 rotates to an open position, the center of mass of the slate tablet computer housing 100 will shift to a point behind the input component 104 and given that the frame component 102 with the slate tablet computer 101 are in upright position, the center of mass will cause the slate tablet computer housing 100 to tip and fall onto the back 106 of the frame component 102 instead of resting on the bottom 112 of the input component 104. This result is in contrast to a normal notebook computer in which the majority of the mass of the computer resides in the keyboard portion and thus allows the LCD screen portion to cantilever backwards without tipping the notebook computer.

Figure 5:
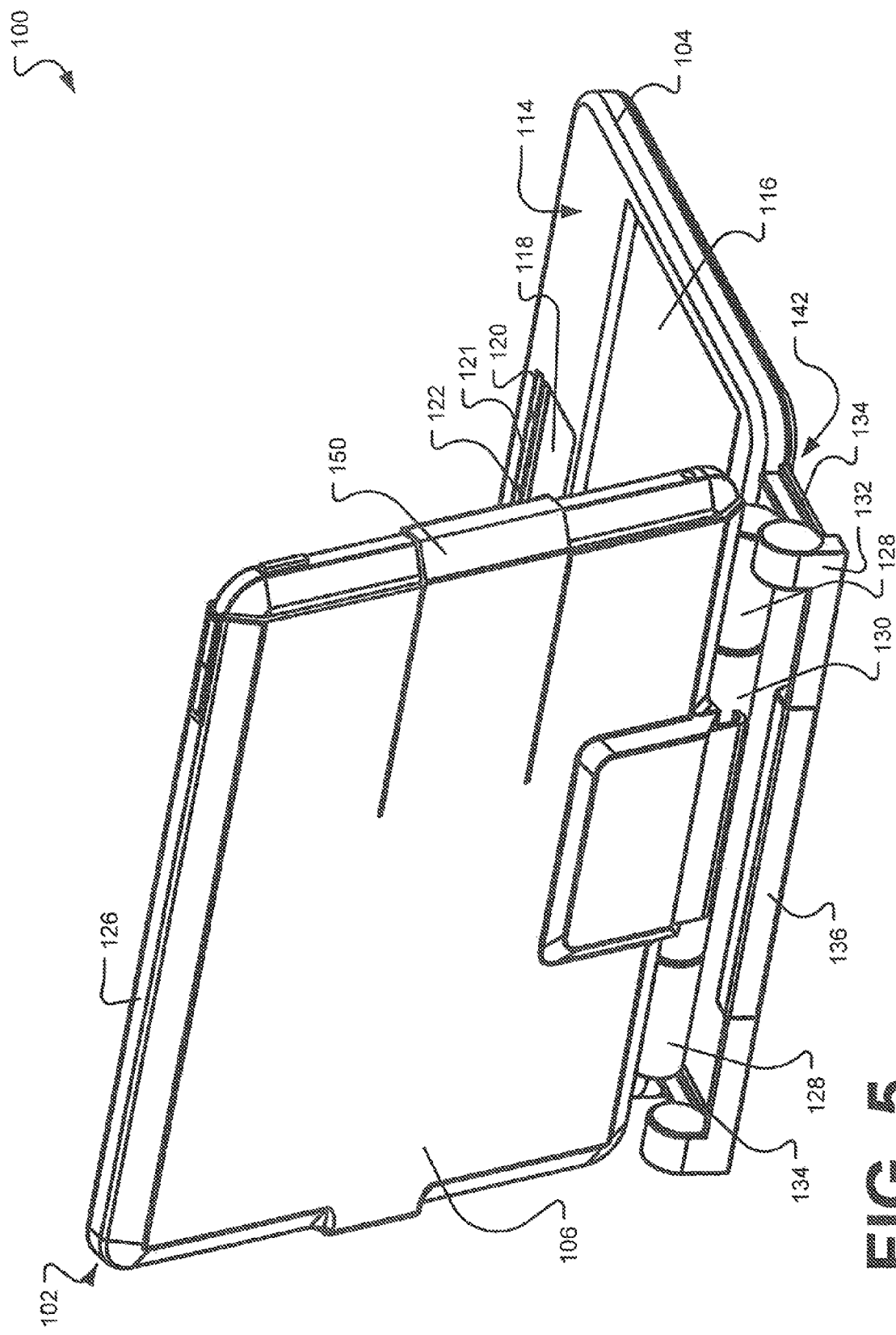
FIG. 5 is rear isometric view of the slate tablet computer housing of FIG. 1 with the counter-balance mechanism extended.
Figure 6:
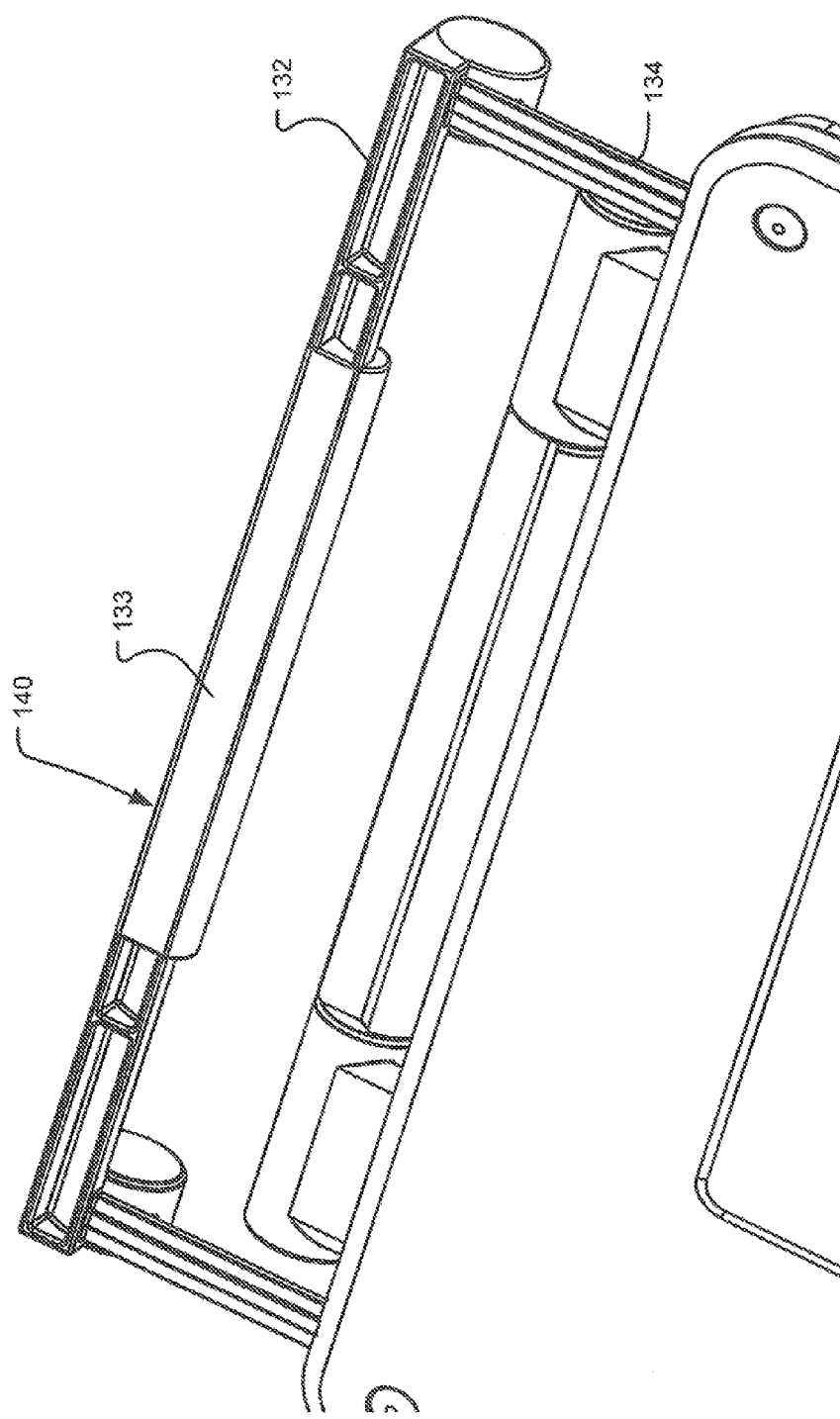
FIG. 6 is an isometric view of the bottom of the slate tablet computer housing of FIG. 1 depicting the counter-balance mechanism in the extended position.

In order to remedy this situation, the input component 104 is designed to house an extending counterbalance armature 132, which, when in an extended configuration as shown in FIGS. 4, 5, 6, 7a, 7b, and 8 acts to oppose the rotating of the slate tablet computer housing around a hinge connecting the frame component and the input component and to maintain the slate tablet computer housing 100 in an upright position. In the implementation shown in the figures, the counterbalance armature 132 may be designed to mate with and assume the same form factor, as the tension hinges 128, 130 in a retracted position as shown in FIGS. 1-3, and extend on rails 134 to a position behind the tension hinges 128, 130 in an extended configuration. The counterbalance armature 132 extends across the back of the input component 104 between the rails 134. As shown in FIGS. 3 and 6, a bottom face 133 of the counterbalance armature 132 is flat and lies in the same plane as the bottom 112 of the input component 104 to allow the slate tablet computer housing 100 to lie flat against a plane, e.g., a work surface such as a table or desk.

FIG. 5 provides a rear isometric view of the slate tablet computer housing 100 of FIG. 1 with the counter-balance mechanism, in the form of a counterbalance armature 132, extended. In this configuration, the extended counterbalance armature 132 prevents the weight of the frame component 102 with the slate tablet 101 from tiling over the entire slate tablet computer housing 100.

Now referring to FIG. 6, it illustrates an isometric view of the bottom of the slate tablet computer housing 100 of FIG. 1 depicting the counter-balance mechanism, in the faun of a counterbalance armature 132, extended. As illustrated in FIG. 6, the counterbalance armature 132 can also be used as a handle to carry the slate tablet computer 101 when it is housed in the slate tablet computer housing 100.

Figure 7A:
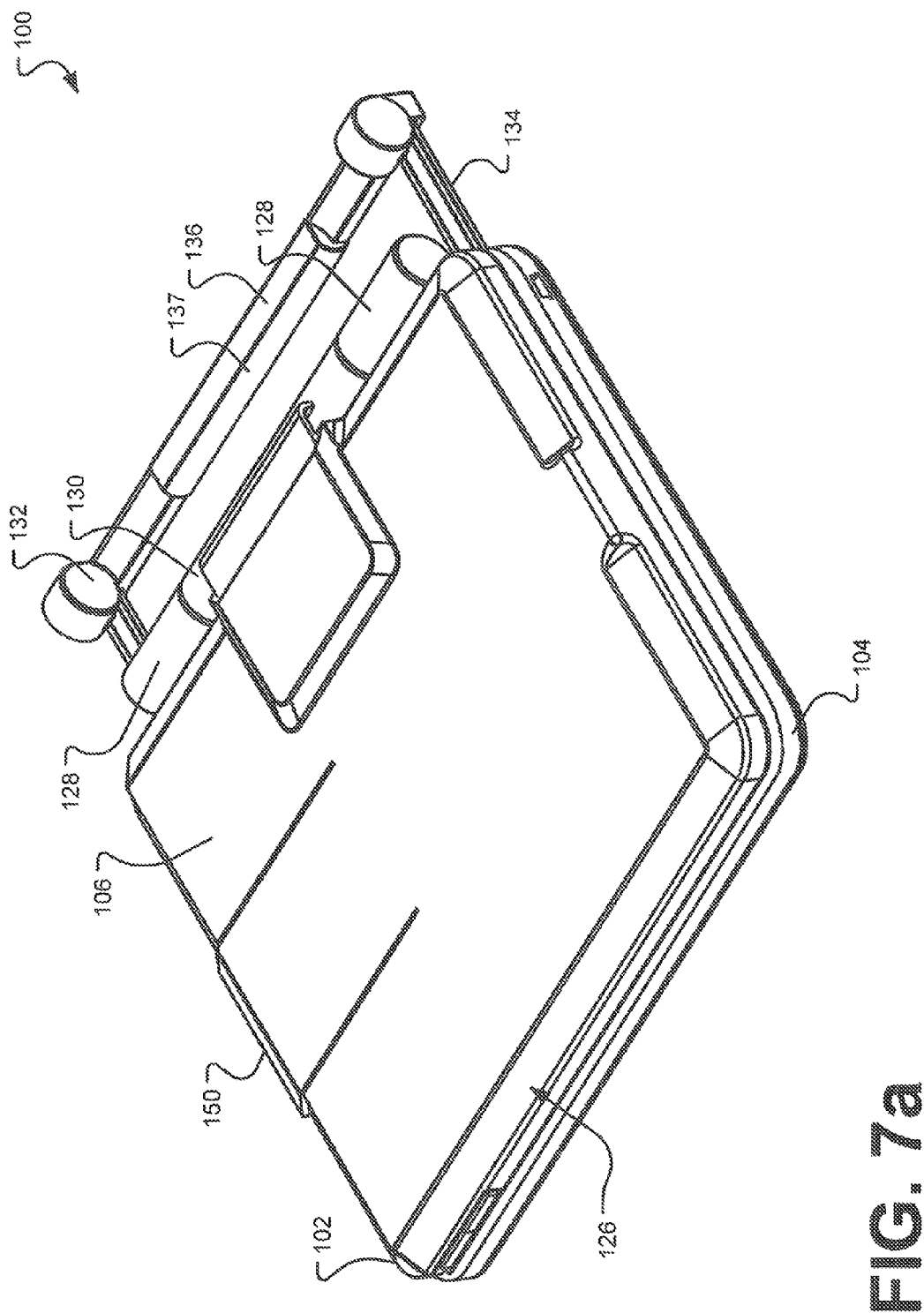
FIG. 7a is an isometric view of the slate tablet computer housing of FIG. 1 with a counterbalance armature in an extended position.
Figure 7B:
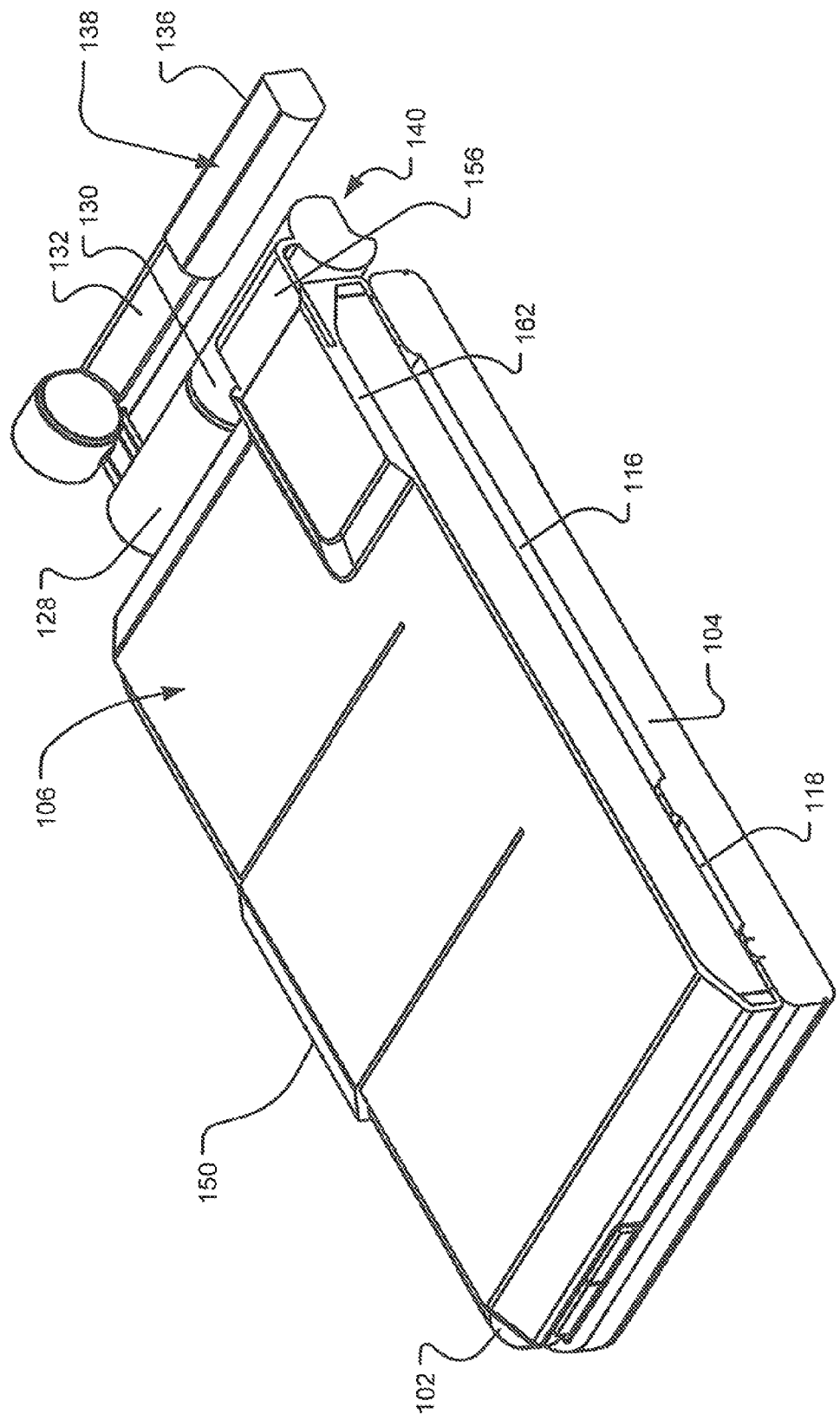
FIG. 7b illustrates an isometric view cross-section of a portion of the slate tablet computer housing of FIG. 1 depicting the counterbalance armature in an extended position and an interface tab connected to the rotating tension hinge and a corresponding tab slot on the frame component used to join the frame component and the interface tab together.

FIG. 7a illustrates an isometric view of the slate tablet computer housing 100 of FIG. 1, with a counterbalance armature 132 in an extended position. On the other hand, FIG. 7b illustrates an isometric view cross-section of a portion of the slate tablet computer housing 100 of FIG. 1 depicting the counterbalance armature 132 in an extended position and an interface tab 156 connected to the rotating tension hinge 130. A corresponding tab slot 162 on the frame component 102 is used to join the frame component 102 and the interface tab 156 together. The interface tab 156 further includes one or more connection traces. In on implementation, the tab slot 162 in the frame component 102 includes one or more receptacles configured to communicatively engage the connection traces of the interface tab 156.

In another implementation, the slate tablet computer housing 100 includes a mechanism that automatically extends the counterbalance armature 132 as the frame component 102 is opened with respect to the input component 104. For example, in one configuration, one or more gear-like elements (not shown) are formed in the hub of the rotating tension hinge 130, mating with an intermediate gear (not shown) that engages with a toothed surface (not shown) of one or more of the rails 134. In this manner, as the frame component 102 is raised with respect to the input component 104, the connector 156 rotates the rotating tension hinge 130, which rotates the intermediate gear in the opposite direction against the toothed surface of the rail 134 to force the rail 134 to move, thereby extending the counterbalance armature 132. The automatic extension of the counterbalance armature 132 may be disabled using a release (not shown). For example, the release can decouple the gear-like element from the intermediate gear, so as to allow the connector 156 to open (and the rotating tension hinge 130 to rotate) without rotating the intermediate gear.

In other implementations, a spring-loaded rotating tension hinge system assists with the auto-extension of the counterbalance armature 132, which could be invoked by way of a cog and toothed track or by pneumatics, which are compressed when the frame component 102 is shut and then auto-decompressed when the frame component 102 is opened again. In yet other implementations, a set of cables and pulleys may be employed to automatically extend the counterbalance armature 132.

It should be appreciated that when the slate tablet computer housing 100 is in a closed configuration such as FIGS. 2, 7a, and 7b, the counterbalance armature 132 may be extended to act as a handle for carrying the tablet computer. A handle portion 136 may be formed in a middle section of the counterbalance armature 132 coextensive with the width of the rotating tension hinge 130. The handle portion 136 of the counterbalance armature 132 may also define a curved or rounded surface 137 that faces the back or rear of the keyboard component 104. Such a rounded surface 137 on the handle portion 136 may be desirable for ease and comfort in gripping the handle 136 in a user's hand.

In one implementation, a handle portion 136 of the counterbalance armature 132 may also define an engagement surface in the form of a flat face 138 on the top side of the counterbalance armature 132. In another implementation, a handle recess 140 may be defined within the bottom of the rotating tension hinge 130. The handle recess 140 may have an engagement surface in form of a flat surface opposing the flat face 138 of the handle 136 when the counterbalance armature 132 is in a retracted configuration. It may thus be appreciated that when the slate tablet computer housing 100 is in a closed configuration as depicted in FIG. 2 and the counterbalance armature is in a contracted configuration mating with the tension hinges 128, 130, a user will be unable to open frame component 102 from its position against the input component 104. This is because the interface between the flat face 138 of the handle 136 and the handle recess 140 in the rotating tension hinge 130 prevents the rotating tension hinge 130 from rotating with respect to the stationary tension hinges 128. This configuration therefore allows a user to extend the counterbalance armature 132 before opening the frame component 102 with respect to the input component 104, thereby ensuring that the slate tablet computer housing 100 does not tip over when placed in an open configuration.

Figure 8:
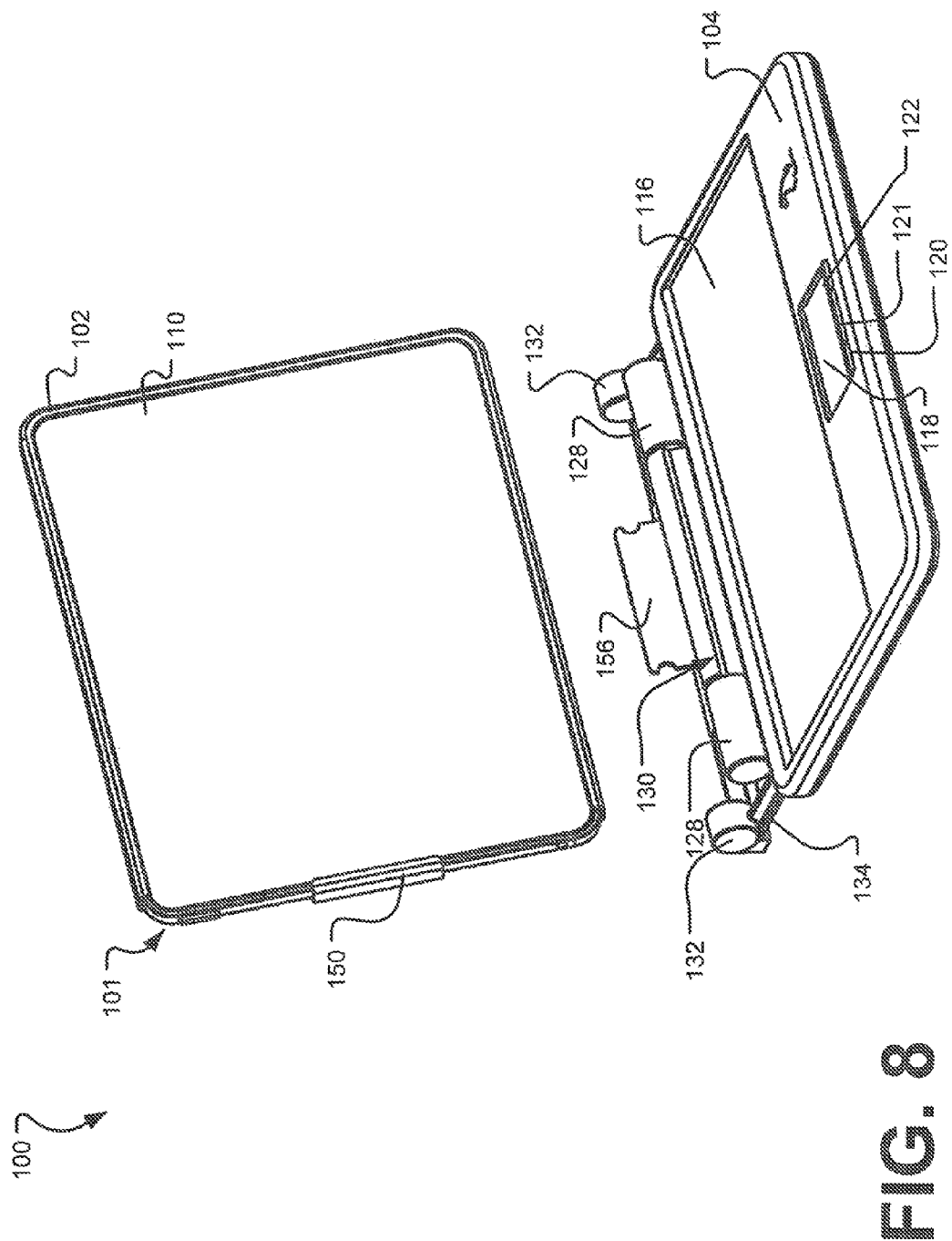
FIG. 8 is an isometric view of the slate tablet computer housing of FIG. 1 depicting the frame component separated from the keyboard component in particular the interface tab on the keyboard component used to join the frame component and the keyboard component together.

FIG. 8 shows the slate tablet computer housing 100 in a configuration in which the frame component 102 is separated from the input component 104. Recall that all computer hardware is housed within the slate tablet computer 101 inserted in the frame component 102. Therefore, the frame component 102 may be removed from the input component 104 and used independently as a true tablet computing device with user interface control implemented through the touch screen LCD 110, for example, by using a stylus or other similar implement. The frame component 102 may be fabricated with an overmold grip 126 for ease of grasping and holding the frame component 102 by a user when in a separated configuration.

The overmold grip 126 may be a plastic, rubber, or an elastomer coating over a portion of the housing of the frame component 102.

As shown in FIGS. 7b and 8, the frame component 102 may connect with the input component 104 via an interface tab 156 extending from the rotating tension hinge 130. The interface tab 156 fits in a tab slot 162 within the bottom edge of the frame component 102. The interface tab 156 may have recessed engagement keys on each lateral side that interfaces with an engagement structure within the tab slot 162. Such an engagement structure may be in the form of a rubber gasket, a ball-plunger, or other friction fitting mechanisms mounted on lateral ends within the tab slot 162 in order to removably, but frictionally, engage the interface tab 156 within the tab slot 162. The friction fit between the interface tab 156 and the tab slot 162 should be sufficient to support the weight of the frame component 102 in the event the slate tablet computer housing 100 is turned upside down when the frame component 102 is attached to the input component 104. However, the force of the friction fit should be such that the interface tab 156 is released from within the tab slot 162 upon the exertion of a moderate amount of pulling force by a user to separate the frame component 102 from the input component 104.

In one implementation, when the frame component 102 has a slate tablet computer 101 inserted, and the frame component 102 is detached from the input component 104, the frame component 102 may be affixed to a mount, such as a wall mount or dash mount, that provides for a kiosk function. In some implementations, the mount may also provide an electrical connection for charging a slate tablet computer.

As shown in FIGS. 5, 6, and 7a, the rails 134 extending from the counterbalance armature 132 are housed within rail slots 142 in the input component 104. It may be appreciated that since the input component 104 does not house any of the hardware of the slate tablet computer 101, there is adequate space available within the input component 104 for housing the rails for the counterbalance armature 132. As shown in the figures, the counterbalance armature may be in the shape of a T in order to provide lateral, vertical, and torsional stability to the counterbalance armature 132 as well as tensile strength to the rails 134 when in an extended position. The rail sockets 142 may similarly be T-shaped to conform to the shape of the rails 134. The rail sockets 142 may be configured with retention hardware similar to hardware used in drawer rails in order to prevent the rails 134 of the counterbalance armature 132 from pulling completely out of the rail sockets 142. This allows the counterbalance armature 132 to be used as a handle as previously described. The rail sockets 142 may further be configured with a friction fit or other mechanism that engages the rails 134 when the counterbalance armature 132 is in a contracted or closed position in order to prevent the counterbalance armature 132 from accidentally sliding out and extending in the absence of some positive pulling force initiated by a user.

In one implementation, the back of the frame component may be configured with one or more mounting holes to allow the frame component or the entire slate tablet computer housing to be mounted to a surface, for example, a wall. The mounting holes may be simple threaded apertures, for example, a standard quarter-20 threads into which screws may be fixed. Alternatively, the mounting holes could be configured as bayonet fittings, use ball plungers, or provide any other retention mechanism. A variety of mounting hardware and frames may thereby be affixed to the back of the frame component to assist in mounting the slate tablet computer housing in a variety of configurations, for example, to a flat surface, on an articulated or hinged arm, or otherwise.

In an exemplary implementation, modules for managing attachment, detachment and operation of the keyboard and other modules may be incorporated as part of the operating system, application programs, other program modules, or circuit components. Data pertaining to the management of the detachable keyboard and other data may be stored as program data.

Figure 9:
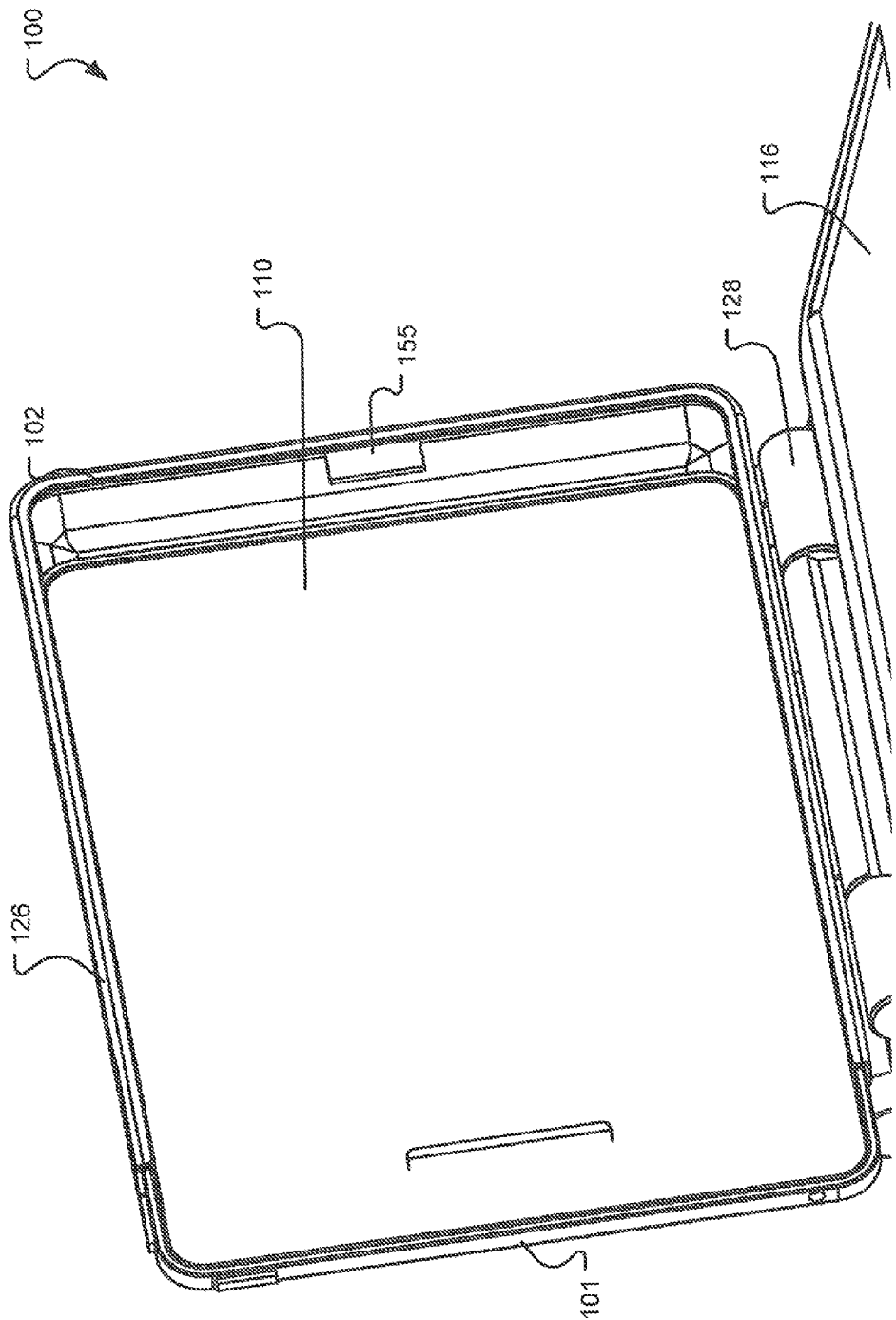
FIG. 9 illustrates a slate tablet computer partially inserted into the slate tablet computer housing of FIG. 1.

FIG. 9 illustrates a slate tablet computer 101 partially inserted into the slate tablet computer housing 100 of FIG. 1. As illustrated in FIG. 9, the slate tablet computer 101 can be inserted into the frame component 102 in a manner such that the slate tablet computer 101 is communicatively attached to the proprietary connector 155.

Figure 10:
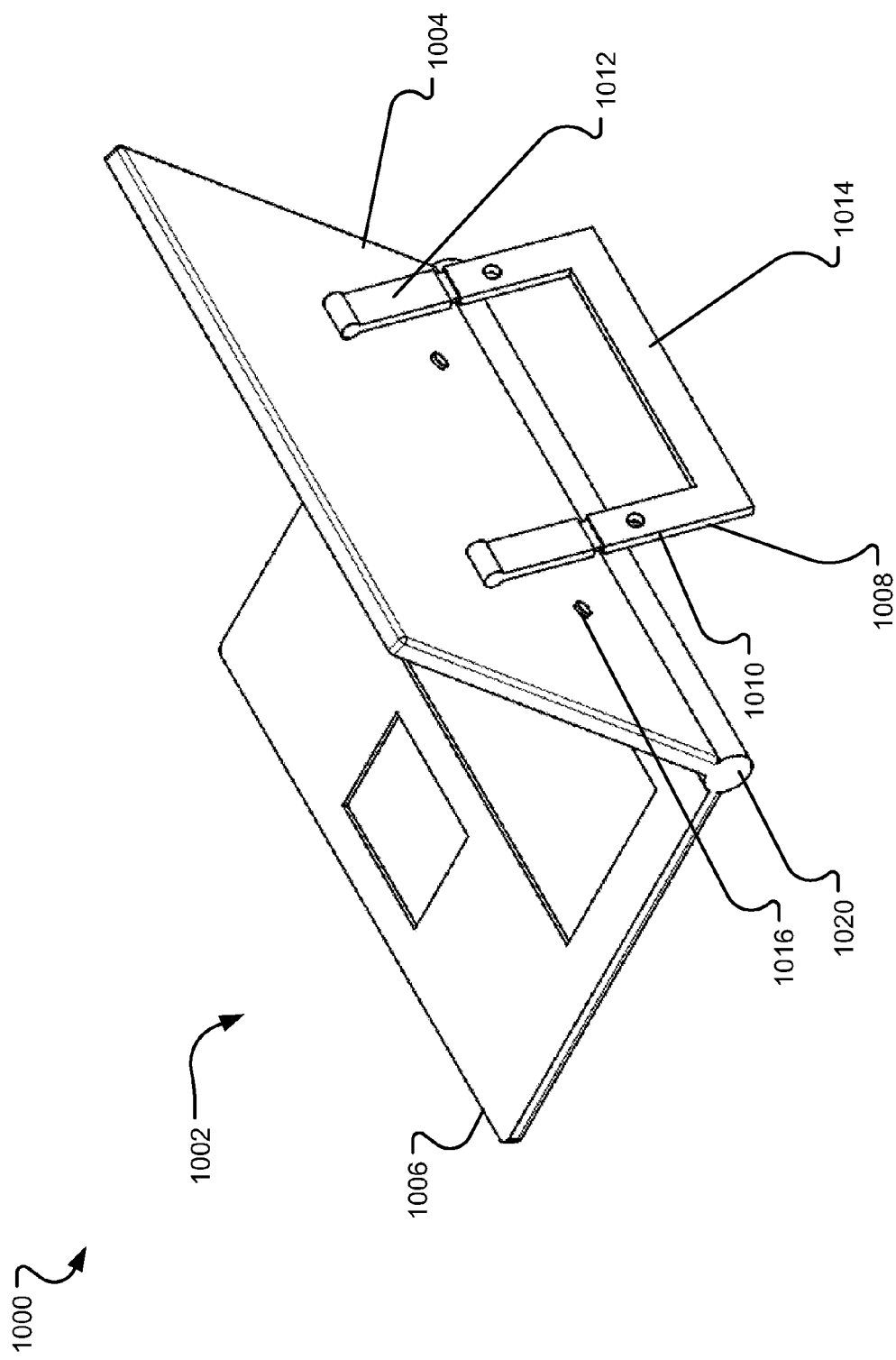
FIG. 10 illustrates a back view of a slate tablet inserted into an alternate frame component of a housing.

FIG. 10 illustrates a back view 1000 of a slate tablet inserted into an alternate frame component of a housing 1002. The alternate housing 1002 includes an upper component of the frame 1004 and a lower component of the frame attached to a keyboard 1006. The upper component of the frame 1004 is provided with a support mechanism 1008 that is attached to the back of the frame 1004 and is extendible away from the upper component of the frame 1004. The support mechanism can be in the form of a tripod structure or the like. By allowing to extend the center of mass beyond the hinge 1020, such a support mechanism provides protection against the frame component 102 and the tablet computer 101 falling over. Here the hinge 1020 connects the upper component of the frame 1004 with the keyboard 1006. If there were no support mechanism, tilting the frame component 104 may cause the slate tablet computer housing 100 to rotate around the hinge 1020 and potentially tip over. In one implementation, the support mechanism 1008 is attached to the back of the upper component of the frame 1004 via a hinge mechanism. However, alternate connecting mechanisms are also contemplated.

The support mechanism 1008 includes a lower portion 1010 that is extendible from the upper portion 1012. In one implementation the support mechanism can be secured at one of various position of the upper portion 1012 versus the lower portion 1010 such that the frame is supported at various angles relative to the keyboard. The lower portion 1010 of the support mechanism 1008 is also provided with an elongate bar 1014. A user can use the elongate bar 1014 as a support when using the frame 1004 with a tablet on a desk, on user's lap, etc. The support mechanism 1008 can be collapsed and attached to the back of the upper component of the frame 1004 via Velcro 1016 or other such fastening mechanism.

In one implementation, the support mechanism 1008 is also used as a handle to carry a tablet in the frame 1004. In such an implementation, the supporting mechanism 1008 can be secured in a position parallel to the back of the upper component of the frame 1004.

In yet alternate implementation, the weight of the lower component of the frame together with the keyboard 1006 is such that when the upper component of the frame 1004 together tablet inserted therein is tilted away from the keyboard 1006, the center of mass still remains in front of the hinge 1020, thus preventing the tablet from falling over.

FIG. 11 illustrates a flowchart 1100 of using the slate tablet computer 101 with the slate tablet computer housing 100 illustrated herein. Specifically, FIG. 11 illustrates various operations 1101 to 1130 that a user may engage in to use the slate tablet computer 101 with the slate tablet computer housing 100 according to one implementation disclosed herein. In an alternate implementation, one or more of the operations 1101 to 1130 may not be required or they may be used in conjunction with additional steps not disclosed herein.

Specifically, at operation 1101 a user opens the frame component 102 by prying the upper portion of the frame component 102 from the input component 104 against the constraint of a hinge which holds the frame component 102 and the input component 104 in relation to each other. Initially, the frame component 102 is devoid of the tablet that it is designed to hold. Subsequently, at operation 402, the user aligns the tablet computer 101 with the empty portion of the frame component 102 and then inserts the tablet computer 101 into the frame component 102, pressing it until it comes to a rest.

At a determining operation 1104 it is determined whether the tablet computer housing 100 includes any communication connector such as the proprietary connector 155 that may allow the slate tablet computer 101 to be communicatively connected to the input component 104. In one implementation, the proprietary connector 155 may be connected via physical communication data link to the input component 104. If it is determined that the tablet computer housing 100 includes any communication connector, at operation 1106, the tablet computer 101 is connected to the communication connector, such as the proprietary connector 155. As a result, the tablet computer 101 is able to communicate through the proprietary connector 155 via a physical data link connector to the keyboard, track-pad, etc., provided on the input component 104. Alternatively, the input component 104 may be provided with a wireless communication mechanism, such as a Bluetooth transmitter, to communicate wirelessly with the tablet computer 101.

Subsequently, at operation 1108, the user engages a clasp on the edge of the frame component 102 from where the slate tablet computer 101 is inserted into the frame component 102 to ensure that the slate tablet computer 101 does not unintentionally fall from the frame component 102. Such a clasp may in the form of pressure-fit clasp, a Velcro clasp, etc.

At operation 1110, the user can adjust the viewing angle of the tablet computer 101 as compared to the input component 104 by pivoting the frame component 102 around the hinge connecting the frame component 102 and the input component 104. At operation 1112 it is determined if there is any counterbalance mechanism provided that will allow the frame component 102 with the weight of the slate tablet computer 101 inside it to be tilted away from the input component 104 without tilting over the entire housing 100. In one implementation, such a counterbalance mechanism is provided in the form of a counterbalance armature that can be manually or automatically extended away from the input component 104.

At an operation 1114, the user adjusts the counterbalance mechanism such that the frame component 102 with the slate tablet computer 101 can be tilted to the proper angle without causing the slate tablet computer housing 100 to tip-over. The angle or distance to which such counterbalance mechanism is extended is dependent upon the location and means by which the slate tablet computer housing 100 is used. If the counterbalance armature is designed to be extended manually, the user adjusts the counter balance to by, for example, pulling the counterbalance armature away from the input component. In one configuration, where the slate tablet computer housing 100 is placed on the user's lap, the counterbalance is opened and set across the legs of the user. In another configuration, where the slate tablet computer housing 100 is placed on a desk, the counter balance is opened and set across the desk.

In an alternate implementation, the slate tablet computer housing 100 does not include a counterbalance mechanism, but it incorporates additional mass in the input component 104 in order to counter the mass of the combination of the frame component 102 and the slate tablet computer 101. In such a configuration, the user is not required to adjust a counterbalance mechanism.

Once the user has placed the slate tablet computer housing 100 on a desk or similar work surface, or on his or legs if in a seated position, the user may now adjust the angle of the frame component 102 which houses the tablet to an angle (compared to the input component 104) at which the user is viewing the tablet computer 101.

Subsequently, at an operation 1116, the user presses the power button of the slate tablet 101 to power it on.

A determining operation 1118 determines if the input component 104 has capability to communicate with the slate tablet 101 wirelessly, such as by Bluetooth, etc. If such capability is available, at an operation 1120, the slate tablet 101 may scan and find the keyboard and track-pad of the input component wirelessly and connect with them wirelessly. Note that establishing such wireless connection may require a one time or security enabled set up procedure.

Once the tablet computer 101 is communicatively connected with the input component 104, either wirelessly or via data-link wired connector, at operation 1122, the user can start using the tablet computer 101 using the keyboard, the track-pad, and other input devices provided on the input component 104.

When the user has completed using the tablet computer 101, the user can close the slate tablet computer housing 100 at an operation 1124. In one case, the user can leave the tablet computer 101 powered on while the frame is closed, or alternatively, the user can turn-off the tablet computer 101 before closing the slate tablet computer housing 100.

At determining operation 1126, the user determines if the user is going to simply store the tablet computer 101 in the slate tablet computer housing 100 or if the user is going to transport the tablet computer 101 together with the slate tablet computer housing 100. If not transportation is required at this point, at operation 1128 the user stores the slate tablet computer housing 100 with the tablet computer 101. On the other hand, if the user is interested in transporting the tablet computer 101, at operation 1130, the user can pull the support mechanism, which may also substitute as transporting handle for the slate tablet computer housing 100.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understand that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:
1. A slate tablet computer housing, comprising a frame component to receive a slate tablet computer;
an input component connected with the frame component; and
a support mechanism attached to the input component, wherein the support mechanism extends from the input component to oppose rotating of the slate tablet computer housing around a hinge connecting the frame component and the input component, wherein the frame component having an open side to receive the slate tablet computer, the open side being orthogonal to the hinge, and a clasp mechanism attached to a back surface, wherein the clasp mechanism secures the slate tablet computer in the frame component, and wherein the support mechanism is a counterbalance armature that is retractable with respect to the input component and is at least partially housed within the input component when in a retracted position.

2. The slate tablet computer housing of claim 1, wherein the frame component further comprises a connector side opposite the open side, the connector side including a connector to communicatively connect the slate tablet computer with the input component.

3. The slate tablet computer housing of claim 1, wherein the input component further comprises a housing that defines two or more slots; and the counter balance armature further comprises two or more rails that are respectively received and housed within the two or more slots.

4. The slate tablet computer housing of claim 1, wherein the input component further comprises an engagement structure in each of the two or more slots that engages the rails to prevent the counter balance armature from separating from the input component when fully extended.

5. The slate tablet computer housing of claim 2, wherein the connector is wirelessly connected to the input component.

6. The slate tablet computer housing of claim 1, wherein the counterbalance armature functions as a handle for the slate tablet computer housing.

7. The slate tablet computer housing of claim 1, wherein the input component further comprises: one or more fixed tension hinges; and a rotating tension hinge rotationally engaged with the one or more fixed tension hinges.

8. The slate tablet computer housing of claim 7, wherein the rotating tension hinge further comprises an interface tab; and the frame component further comprises a tab slot configured to releasably engage the interface tab.

9. The slate tablet computer housing of claim 8, wherein the frame component is configured to attach to a wall mount.

10. The slate tablet computer housing of claim 8, wherein the rotating tension hinge further comprises a first engagement surface; the counterbalance armature is retractable with respect to the input component and defines a second engagement surface; and when the counterbalance armature is at least partially housed within the input component, the first engagement surface interfaces with the second engagement surface and prevents the frame component from being manipulated from a closed position to the open position.

11. The slate tablet computer housing of claim 1, wherein the counterbalance armature is forced to automatically extend from the input component as the frame component moves into an open position with respect to the input component.

12. The slate tablet computer housing of claim 11, wherein the input component lies in a plane and the counterbalance armature extends along the plane of the input component.

13. The slate tablet computer housing of claim 1, wherein the frame component further comprises a proprietary connector to communicatively connect to the slate tablet computer.

14. The slate tablet computer housing of claim 13, wherein the proprietary connector is communicatively connected to the input component via a physical data link.

15. A slate tablet computer housing, comprising:
a frame component having an open side to insertably receive a slate tablet computer and a wireless connector to communicate with an input component, the open side being orthogonal to a hinge connecting the frame component and the input component;
the input component removably connected with the frame component; and
a support mechanism attached to the frame component, wherein one end of the support mechanism is attached to a back surface of the frame component and a second end of the support mechanism swings away from the frame component.

16. The slate tablet computer housing of claim 15, wherein the support mechanism further comprises a clasp to secure the slate tablet computer from sliding out of the open side.

17. A method of using a slate tablet computer, the method comprising:
inserting the slate tablet computer into a frame component of a slate tablet computer housing through an open side of the frame component the open side being orthogonal to a hinge mechanism connected to the input component;
communicatively attaching the slate tablet computer to a connector located on a connector side of the frame component, wherein the connector is wirelessly connected to an input component;
attaching the frame component to the input component;
opening the frame component around the hinge mechanism connected to the input component; and
retracting a support mechanism away from the input component.

18. The method of claim 17, wherein retracting the support mechanism away from the input component comprises automatically retracting the support mechanism as the frame component is opened.

19. The slate tablet computer housing of claim 15, wherein the connector is located on a connector side of the frame opposite the open side, and wherein a bottom side between the connector side and the open side is configured to be removably connected to the input component.

* * * * *